(12) United States Patent
McQueen et al.

(10) Patent No.: US 10,375,543 B2
(45) Date of Patent: Aug. 6, 2019

(54) REMOTELY CONTROLLING ASPECTS OF POOLS AND SPAS

(71) Applicant: Zodiac Pool Systems LLC, Vista, CA (US)

(72) Inventors: E. Keith McQueen, Vista, CA (US); David Nibler, Vista, CA (US); Dindo Uy, North Hollywood, CA (US); David Goldman, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 15/876,560

(22) Filed: Jan. 22, 2018

(65) Prior Publication Data
US 2018/0206088 A1    Jul. 19, 2018

Related U.S. Application Data

(63) Continuation of application No. 13/600,567, filed on Aug. 31, 2012, now abandoned.

(51) Int. Cl.
| | | |
|---|---|---|
| *H04W 4/38* | (2018.01) | |
| *H04W 4/20* | (2018.01) | |
| H04W 84/12 | (2009.01) | |

(52) U.S. Cl.
CPC .............. *H04W 4/38* (2018.02); *H04W 4/20* (2013.01); *H04W 84/12* (2013.01)

(58) Field of Classification Search
CPC .......... H04W 4/38; H04W 4/20; H04W 84/12
See application file for complete search history.

(56) References Cited

U.S. PATENT DOCUMENTS

| | | |
|---|---|---|
| 7,292,898 B2 | 11/2007 | Clark et al. |
| 7,489,986 B1 | 2/2009 | Laflamme et al. |
| 8,443,063 B1 | 5/2013 | Nelson et al. |
| 8,771,504 B2 | 7/2014 | Mastio et al. |

(Continued)

FOREIGN PATENT DOCUMENTS

| | | |
|---|---|---|
| WO | 2013163674 | 11/2013 |
| WO | 2014035637 | 3/2014 |

OTHER PUBLICATIONS

Dhawan, "Analogy of Promising Wireless Technologies on Different Frequencies: Bluetooth, Wi Fi, and WiMAX", Wireless Broadband and Ultra Wideband Communications, The 2nd International Conference on, IEEE, Aug. 1, 2007, 14 pages.

(Continued)

*Primary Examiner* — Walli Z Butt
(74) *Attorney, Agent, or Firm* — Kilpatrick Townsend & Stockton LLP; Dean W. Russell (57) ABSTRACT

Systems and methods of (remotely) controlling aspects of pools and spas and of modifying water contained therein are detailed. Internet-enabled access to pool and spa controllers may happen without any need for users to create firewall ports or utilize static internet protocol addresses. Certain networking devices may be configured using a USB connection or SD card, avoiding any requirement for an Ethernet cable or supplying separate power to the devices during configuration. Other devices may be configured wirelessly, without need of any USB connection or SD card. Time-varying data may be obtained in respect of one or more installations and analyzed for various information.

5 Claims, 6 Drawing Sheets

(56) References Cited

U.S. PATENT DOCUMENTS

| | | | |
|---|---|---|---|
| 2008/0039977 A1 | 2/2008 | Clark et al. | |
| 2009/0164049 A1 | 6/2009 | Nibler et al. | |
| 2010/0138786 A1* | 6/2010 | McQueen | G08C 17/02 715/810 |
| 2011/0195664 A1* | 8/2011 | Keirstead | G08C 17/02 455/41.2 |
| 2012/0185571 A1* | 7/2012 | Uy | G05B 19/0426 709/219 |
| 2013/0110319 A1 | 5/2013 | Michelon | |
| 2013/0182693 A1* | 7/2013 | Sperling | H04W 52/0229 370/338 |
| 2013/0223279 A1* | 8/2013 | Tinnakornsrisuphap | H04L 41/0809 370/254 |
| 2013/0282903 A1 | 10/2013 | DeLuca | |
| 2014/0064139 A1* | 3/2014 | McQueen | H04W 4/20 370/254 |

OTHER PUBLICATIONS

International Patent Application No. PCT/US2013/054261, "International Search Report and Written Opinion", dated Mar. 27, 2014, 10 pages.
European Application No. 13779945.8, Office Action dated Apr. 17, 2018, 4 pages.

* cited by examiner

REMOTELY CONTROLLING ASPECTS OF POOLS AND SPAS

CROSS REFERENCE TO RELATED APPLICATION

This application is a continuation of pending U.S. patent application Ser. No. 13/600,567 filed on Aug. 31, 2012, entitled "Remotely Controlling Aspects of Pools and Spas," the entire contents which is incorporated herein by this reference.

FIELD OF THE INVENTION

This invention relates to systems, methods, equipment, and techniques for controlling one or more components of a recreational water recirculation system or modifying one or more characteristics of the water contained within a vessel such as a pool or spa. More particularly, at least some embodiments of the invention relate to Internet-enabled access to residential pool and spa controllers without need for users to create firewall ports or utilize static Internet protocol (IP) addresses. Other embodiments allow connection to controllers without need of a router. Yet other versions include equipment capable of mimicking network access points ("hot spots").

BACKGROUND OF THE INVENTION

U.S. Pat. No. 7,292,898 to Clark, et al., whose contents are incorporated herein in their entirety by this reference, describes various systems for remotely monitoring or controlling pools or spas. Data links may be created between home computer networks and pool/spa controllers and the controllers may be accessed via a combination of the home networks and remote web servers. Data signals may be transmitted to the remote web servers for collection, and command signals may be sent from the remote web servers for purposes of controlling pools and spas.

Controllers of the Clark patent are identified as being "on board" pools and spas. They thus are not in any way remote or separated from the water-containing vessels. Additionally present at or in the pools and spas are sensors "in dynamic communication with the . . . pool or spa water . . . to capture relevant data," which may include information about "temperature, pH, ORP, pump status, heater status, and ozone generation." See Clark, col. 1, ll. 38-48.

Collected data may, according to the Clark patent, be stored either "locally" within the control system or on a remote server. Software algorithms may detect particular error conditions and "alert[] a desired recipient via e-mail, direct pager contact or other communication method, and/or activat[e] an audible alarm." See id., col. 4, ll. 17-34. Homeowners and their maintenance services additionally may be notified to add chemicals to pool/spa water as a consequence of data transmissions via the remote server. See id., ll. 55-65.

Contemplated by systems of the Clark patent is use of, among other things, a "filtering router/firewall" used to access the Internet. See id., col. 5, ll. 26-28; FIG. 2. Controllers may be accessed by devices including a web-enabled phone, a home/office computer/or a PDA with a streamlined browser. These and other user access devices/interfaces can perform remote access function, determine chemical conditions in the water with pH or ORP sensors, conduct simultaneous on-line consultations with others including a chemical dealer or maintenance personnel, or receive alarms that the spa cover or pool gate is open. See id., col. 9, ll. 13-20.

Absent from discussion in the Clark patent are benefits of systems in which users may employ dynamic IP addresses and in which users need not create firewall ports or use routers for purposes of Internet connection. Additionally omitted from disclosure of the Clark patent is any description of configuring wireless fidelity (Wi-Fi) networking devices using, for example, a universal serial bus (USB) connection or a secure digital (SD) card. Such configurations do not require use of any Ethernet cable or provision of separate power to the devices during configuration. They also may be accomplished by an installer, for example, prior to arrival at a residence or installation location.

Likewise omitted from disclosure of the Clark patent is any contemplation of use of data stored on remote servers beyond alerting "desired recipient[s]" to certain error conditions and forwarding water-chemistry information to "a specific chemical supplier or pool/spa maintenance service, or to the homeowner." See id., col. 4, ll. 51-65. Indeed, no aggregating of data is contemplated as to either a single installation or multiple installations. Assessing data aggregated over a given period for a single installation could provide useful information as to trends in either equipment performance or water characteristics at that installation, for example, potentially supplying advance warnings as to equipment degradation or impending water-quality issues. Users also may be furnished energy-usage information and tips for decreasing usage.

Evaluating data aggregated over multiple installations may provide valuable information about regional issues or issues being faced generally by certain types of pools or spas. Such data further could be supplied to retailers, manufacturers, or others for purposes of ensuring adequate inventory of equipment or components if need for multiple repairs or replacements is predicted. Abnormally high use of chemicals and other consumables in a geographic area or in conjunction with certain pools or spas likewise could be discovered and conveyed to homeowners, retailers, and servicers. Yet additional uses of stored data may be made.

SUMMARY OF THE INVENTION

Unlike the Clark patent, the present invention contemplates these multiple uses of data. Additionally, Internet-enabled access to pool and spa controllers may happen without any need for users to create firewall ports or utilize static IP addresses. Wi-Fi networking devices may be configured using a USB connection or SD card, avoiding any requirement for an Ethernet cable or supplying separate power to the devices during configuration. At least some versions of the invention allow connection to controllers without need of a router. Some versions allow wireless configuration of networking devices, with the devices mimicking "hot spots" or other network access points.

Systems of the invention may cause servers of the system providers to track dynamic IP addresses typically assigned to computerized devices by Internet service providers (ISPs). Users employing browsers (or local software applications ["apps"]) existing on either fixed or mobile devices may communicate via the Internet with the servers of the system providers and, therethrough, to networking devices and controllers of their pool/spa control systems. Alternate methods of communication are contemplated as well, as are indoor/outdoor use and easy installation of equipment.

It thus is an optional, non-exclusive object of the present invention to provide systems and methods of controlling aspects of pools and spas in which system users need not have static IP addresses or firewall ports.

It is also an optional, non-exclusive object of the present invention to provide systems and methods of controlling aspects of pools and spas in which Wi-Fi networking devices may be configured using a USB connection, SD card, wirelessly, or otherwise in a manner avoiding any requirement for an Ethernet cable configuration.

It is another optional, non-exclusive object of the present invention to provide systems and methods of controlling aspects of pools and spas in which connections to controllers may be made without need for routers.

It is a further optional, non-exclusive object of the present invention to provide systems and methods of controlling aspects of pools and spas in which data from either or both of (a) a single installation or (b) multiple installations is aggregated as a function of (at least) time.

It is, moreover, an optional, non-exclusive object of the present invention to provide systems and methods of controlling aspects of pools and spas in which aggregated data is analyzed to identify trends in either equipment performance or water characteristics at one or more installations.

It is an additional optional, non-exclusive object of the present invention to provide systems and methods of controlling aspects of pools and spas in which data analysis may result in supplying to users advance warnings as to equipment degradation or impending water-quality issues or energy-usage information (or both).

It is yet another optional, non-exclusive object of the present invention to provide systems and methods of controlling aspects of pools and spas in which aggregated data from multiple installations is evaluated for information about regional issues or issues being faced generally by certain types of pools or spas.

Other objects, features, and advantages of the present invention will be apparent to those skilled in the relevant art with reference to the remaining text and the drawings of this application.

DETAILED DESCRIPTION

Figure 1:
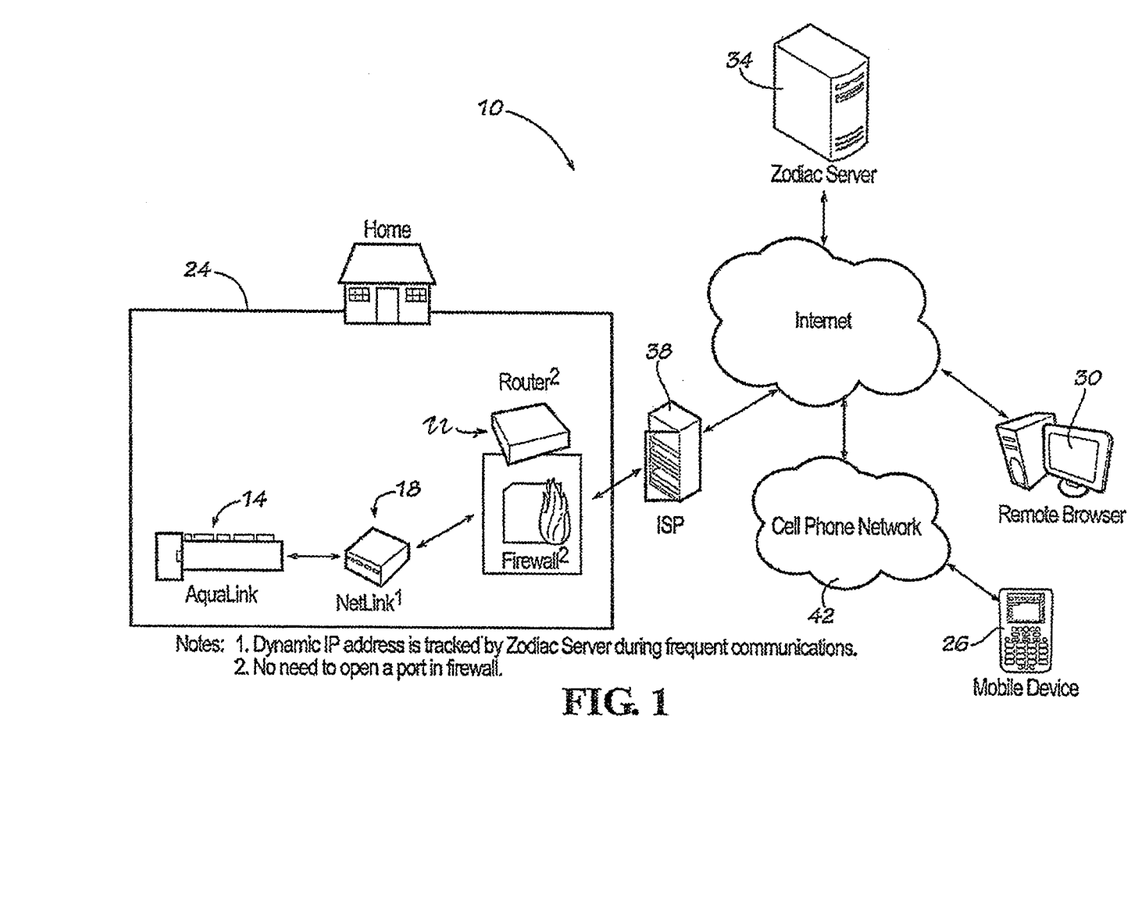
FIG. 1 is a schematicized diagram of aspects of an exemplary system of the present invention.

Illustrated in FIG. 1 are aspects of exemplary system 10 of the present invention. Included as part of system 10 may be computerized controller 14. As shown in FIG. 1, controller 14 may be any of the AquaLink brand of controllers made by Zodiac (formerly known as Jandy). Signals may be sent to and from controller 14 wirelessly, via wires, or in hybrid manner. Regardless of its signal transmission method, controller 14 is designed to control operation of equipment associated with pools and spas; such equipment includes, but is not limited to, water jets, lights, pumps, heaters, active filters, etc.

Networking device 18 also may be included as part of system 10. Device 18 may be any suitable automated apparatus capable of receiving and transmitting signals via the Internet or other network. Information may be transferred among device 18 and controller 14, to which device 18 connects via wires or wirelessly.

Also depicted in FIG. 1 is optional router 22. If present as part of system 10, router 22, as well as controller 14 and device 18, typically may constitute at least part of a single "home" installation 24 and thus typically are present at the installation site. Likewise preferably present at the site are at least one of a pool or spa to be controlled by controller 14. Unlike the controller of the Clark patent, however, controller 14 need not be "on board" any pool or spa, and instead may be located either within or outside the home. Additionally, persons skilled in the relevant art will recognize that reference to "home" installation 24 need not mean only a residential site, but rather may include commercial, association, or other pools or spas too.

System 10 also may include means for accessing the Internet. Such means may include mobile and fixed devices 26 and 30, respectively. Indeed, any device 26 or 30 (including but not limited to conventional smart phones, laptop computers, and desktop computers) equipped with a web browser or local app may be used consistent with the present invention to access the Internet. A device 26 or 30 may be in the control of the user of system 10 responsible for maintenance of a particular pool or spa, whether that user be a homeowner, a service company, an equipment manufacturer, or otherwise. Devices 26 and 30 likewise need not be "on board" a pool or spa but instead may be remote therefrom if and when desired.

Also illustrated in FIG. 1 are one or more servers 34. Servers 34 preferably are maintained by the provider of controller 14 and device 18, although this need not necessarily be true. Because in some versions of system 10 either or both of controllers 14 and devices 18 will be supplied by Zodiac, a server 34 is identified in FIG. 1 as a "Zodiac Server."

Servers 34 also may function to assist in aggregating data from one or more installations 24 for purposes of data analysis and evaluation. In this respect servers 34 are illustrated in FIG. I as proxies for computerized information processing systems. As noted earlier, assessing data aggregated over a given period for a single installation 24 could provide useful information as to trends in either equipment performance or water characteristics at that installation 24, for example. Advanced warning as to equipment degradation or impending water-quality issues thus could be provided to a device 26 or 30. Via device 26 or 30 users also may be furnished energy-usage information and tips for decreasing usage. Similarly as noted above, evaluating data aggregated over multiple installations 24 may provide valuable information about regional issues or issues being faced generally by certain types of pools or spas.

Information from sources other than installations 24 also may be analyzed and evaluated, typically (but not necessarily) in conjunction with data obtained from installations 24. For example, historical temperature and other weather-related information could be considered in developing control signals for one or more installations 24. Similarly, weather forecasts may be considered so that, if an upcoming time period is expected to be warmer (or cooler), wetter (or dryer), etc., than normal, controls for certain installations 24 may be adjusted anticipatorily.

As occurs conventionally, Internet-accessible devices at a residence or other location (such as an installation 24) are assigned IP addresses by an ISP servicing the location. Existing pool/spa controllers typically require assignment of a static (i.e. unchanging) IP address disfavored by ISPs. Instead, ISPs favor provision of dynamic (i.e. time-varying) IP addresses to devices, as the ability to reassign (and thus share) addresses frequently allows ISPs more flexibility in performing their services.

In system 10, device 18 need not have a static IP address. Rather, device 18 may be assigned a dynamic IP address by ISP 38. Server 34 tracks the IP address of device 18 so as to remain able to communicate with device 18 notwithstanding the time-varying nature of its address. Because server 34 does so and no static IP address is required for device 18, no especial need exists to open a port in any computer firewall associated with installation 24.

Figure 2:
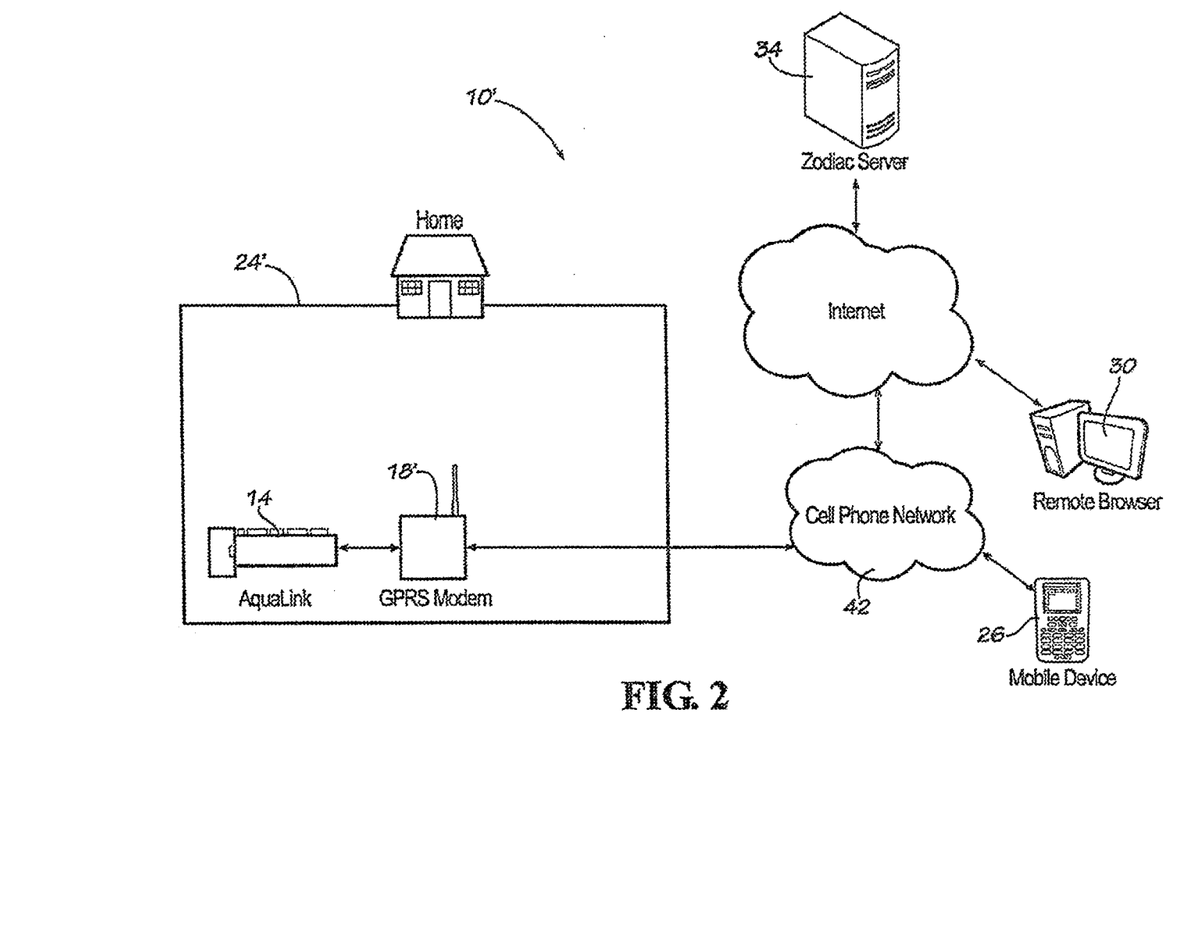
FIG. 2 is a schematicized diagram of aspects of an alternate system of the present invention.

FIG. 2 shows an alternate system 10' consistent with the present invention. System 10' may include servers 34 and allow devices 26 and 30 to communicate with servers 34 via the Internet, as with system 10. It further may include controller 14 as part of installation 24', like installation 24. Unlike installation 24, however, installation 24' may utilize device 18' in the form of a modem to communicate with servers 34. Device 18' may be configured to the standards of the general packet radio service (GPRS) or otherwise as appropriate, and any or all of device 18', mobile device 26, or even fixed device 30 may connect wirelessly to cell phone network 42 (see also FIG. 1). System 10' avoids any need for router 22, for example.

Figure 3:
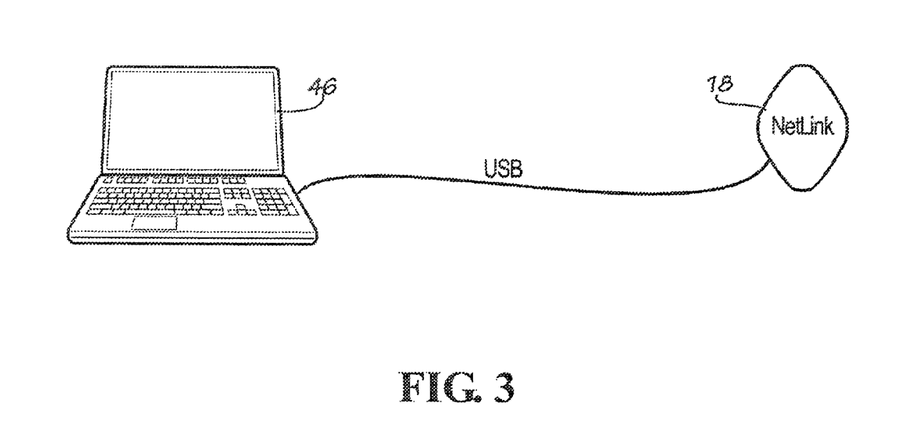
FIG. 3 is a schematicized diagram of a first exemplary WiFi-configuration method.
Figure 4:
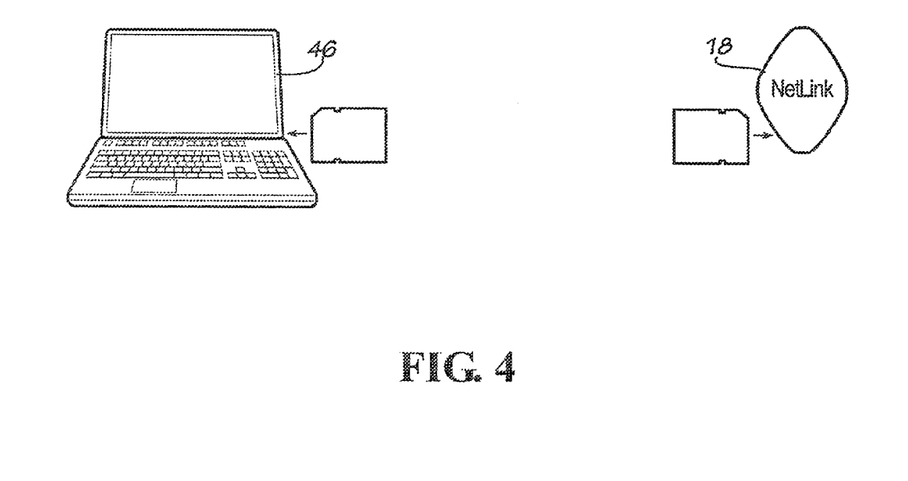
FIG. 4 is a schematicized diagram of a second exemplary Wi-Fi configuration method.

FIGS. 3-4 schematically illustrate certain differing ways to configure device 18 for communication with router 22. If device 18 and router 22 communicate via wires, an Ethernet or other cable may be employed to connect the two components. By contrast, wireless communication may be established as shown in FIG. 3, for example. Detailed in that figure is that device 18 may be connected to a USB port of a desktop or laptop personal computer (PC) 46 intended to communicate with router 22. As so connected to computer 46, device 18 is recognized by computer 46 as a storage device or drive. WiFi configuration may then occur by opening a configuration file, entering WiFi settings (including, for example, service set identifier [SSID] and password information), and saving the entered settings in the memory of device 18. Thereafter device 18 may be disconnected from the USB port of computer 46 and installed or located wherever desired (e.g. outside at a pool/spa equipment pad or inside a residence) so as to communicate with controller 14.

Alternatively, as depicted in FIG. 4, an SD memory card may be inserted into an appropriate port of computer 46. WiFi configuration may occur by opening a configuration file, entering WiFi settings, and saving the entered settings on the SD card. The card then may be removed from computer 46 and inserted into an appropriate port of device 18 to download the saved settings into the device 18. Again, device 18 may be installed or located wherever desired so as to communicate with controller 14.

In each situation identified in FIGS. 3-4, WiFi configuration is easily accomplished without use of an Ethernet cable. Further, configuration may completed by an installer prior to arriving at an installation 24. Yet additionally, no separate power need be supplied to device 18 during configuration. Of course, persons skilled in appropriate fields of endeavor will understand that device 18 may be configured in myriad ways, and the techniques of FIGS. 3-4, while easy and valuable, need not always be utilized.

Figure 5:
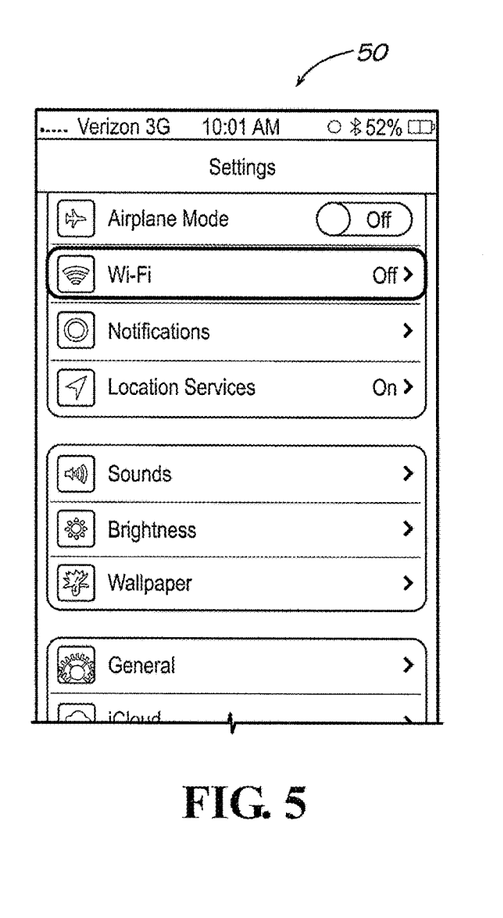
FIGS. 5-8 are exemplary screen-shots illustrating aspects of a third exemplary Wi-Fi configuration method.

Indeed, as part of the configuration process, device 18 itself may broadcast a signal mimicking an access point for a Wi-Fi network. As shown in FIGS. 5-8, any suitably-equipped fixed or mobile device (including, for example, devices 26 and 30) may be used to receive the wireless signal broadcast by device 18. A screen-shot of an exemplary computerized mobile device 50 is illustrated in FIG. 5, with instructions identified for commencing the process to connect the device 50 to device 18.

Figure 6:
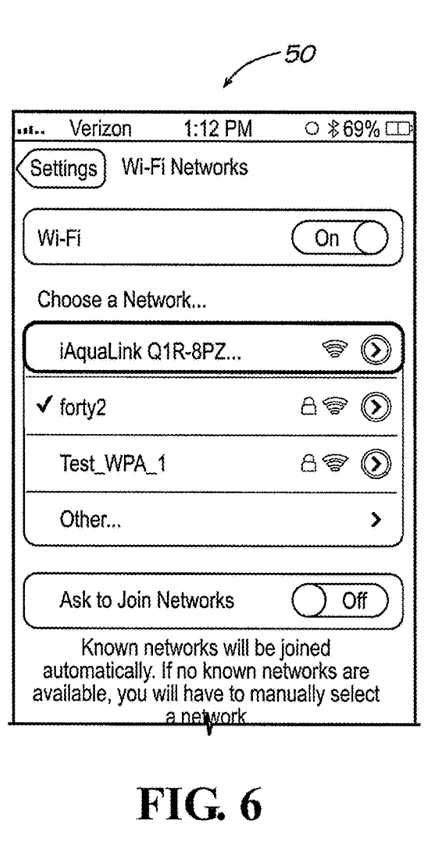

As shown in the example screen-shot of FIG. 6, device 18 has broadcast an SSID signal identifying it as "iAquaLink Q1R-8PZ . . . ." The wireless signal has been received by device 50, listing the identifying signal among the Wi-Fi networks available for connection. Device 50 additionally optionally may display strength and other characteristics of the signal. A user of device 50 thereafter may connect the device 50 for wireless communication with device 18 in the same manner he or she accesses any available Wi-Fi network.

Device 18 likewise is adapted to receive signals broadcast by Wi-Fi networks. After devices 18 and 50 are wirelessly connected, device 18 identifies to device 50 the various network signals it is receiving. As illustrated in the screen-shot of FIG. 7, device 18 has received SSID signals from networks entitled "forty2" and "Test_WPA_1," and transmitted this information to device 50 for display. In effect, therefore, device 18 is reconfigured from a network access device to equipment forming a local area network (LAN) with device 50. Assuming, for example, that network "forty2" is the desired Wi-Fi network with which device 18 will communicate, a user of device 50 may complete Wi-Fi configuration of device 18 merely by designating "forty2" as the correct network.

Figure 8:
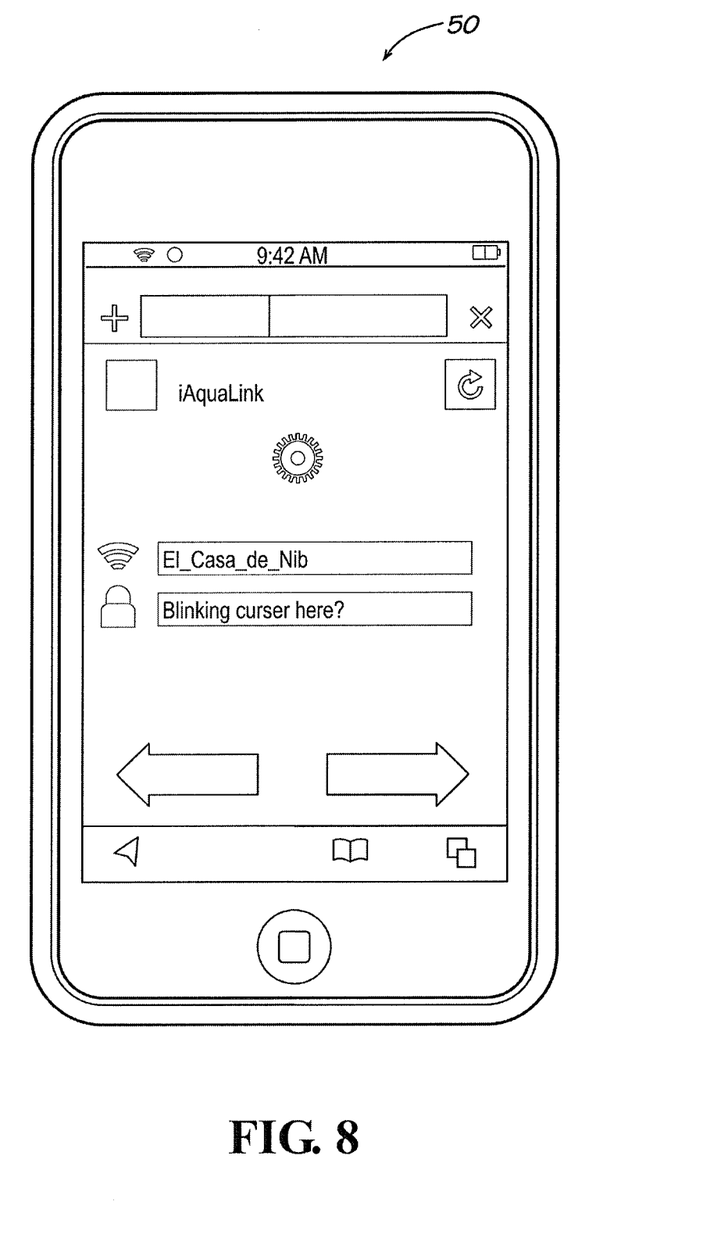

Alternatively, as depicted in FIG. 8, a user of device 50 may designate another network if necessary by manually providing SSID and any other required information. Whether performed automatically or manually, doing so allows device 18 to communicate as part of the "forty2" (or other manually-identified) network as it assists controller 14 in controlling pool, spa, or other equipment. Presently preferred is that controller 14 and device 18 be separate devices, although those skilled in the relevant art will recognize that some or all of their functions may be accomplished in single device.

Based at least in part on information obtained or derived from sensors associated with a pool or spa, controller 14 may be used to control pool/spa equipment as desired to achieve certain results. As communication with servers 34 occurs, servers 34 may receive information from various installations 24 and 24'. Such information typically will vary as a function of time (e.g. a chlorine level in a pool of a particular installation 24 or 24' likely will change over time) and, perhaps, other variables. Moreover, such information typically will vary from installation to installation, especially if installations are remote geographically or contain different equipment. In any event, servers 34 may receive information that usefully may be analyzed in various ways to alert users or others as to issues currently or potentially to be encountered at installations.

Text deleted from original versions of FIGS. 3-8 includes the following:

FIG. 3:

Step 1: Connect NetLink to Home PC or Laptop via USB connection. Home PC or Laptop will recognize NetLink as a storage drive.

Step 2: Open configuration file to enter WiFi settings and save.

Step 3: Disconnect USB connection from NetLink.

Step 4: Install NetLink in equipment pad or inside the residence and connect the RB485 communication bus.

FIG. 4:

Step 1: Insert SD memory card to Home PC or Laptop.

Step 2: Open configuration file to enter WiFi settings and save.

Step 3: Remove SD memory card from Home PC or Laptop.

Step 4: Insert SD memory card to NetLink.

Step 5: Install NetLink in equipment pad or inside the residence and connect the wired RJ45 ethernet connection.

Step 6: Remove SD memory card from NetLink after setup and configuration are completed.

FIG. 5: On an iPhone, select Wi-Fi

FIG. 6: Look for and select the network starting with the word "iAquaLink"

Figure 7:
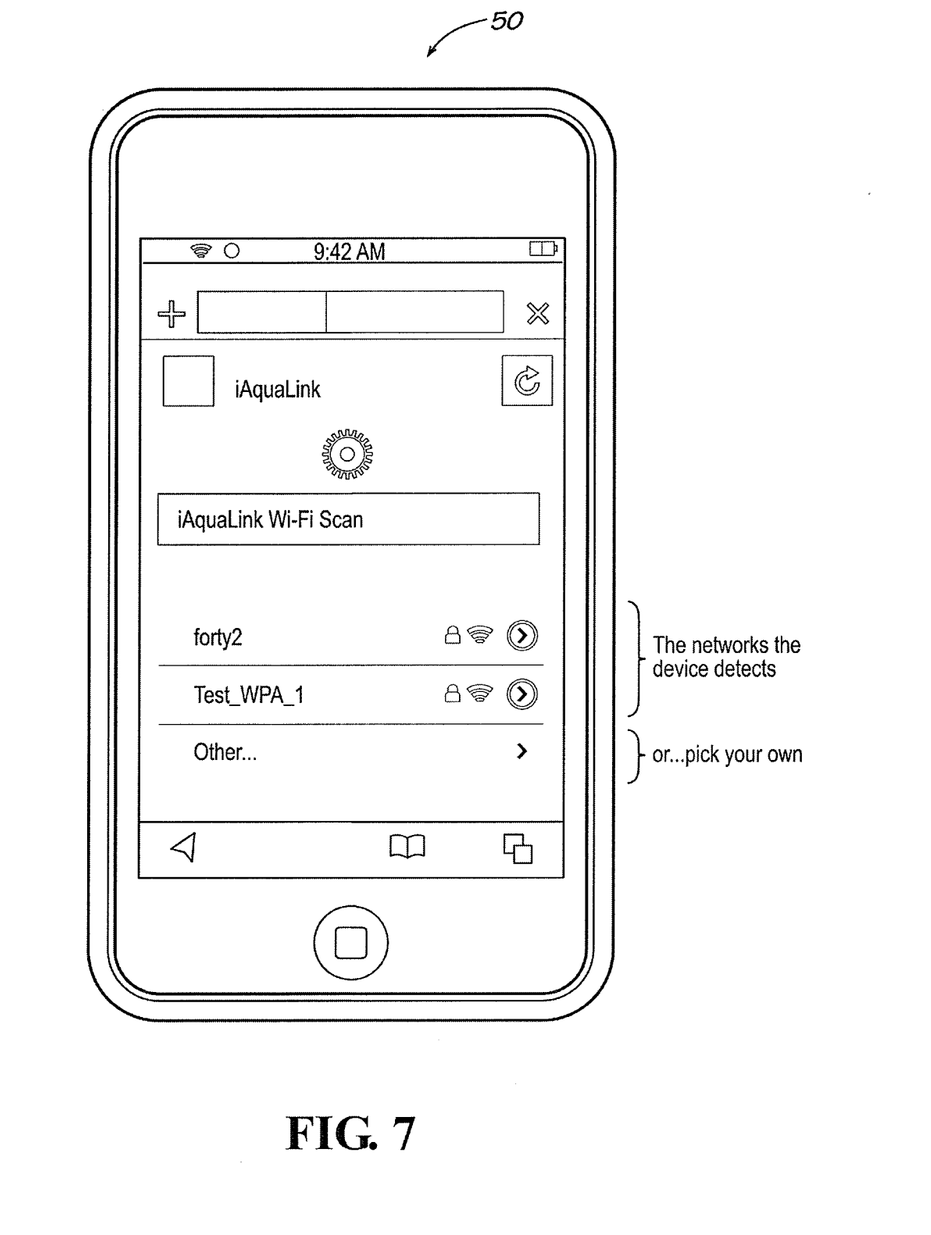

FIG. 7: Select a network. Either . . . a. Select one of the networks iAquaLink detects. b. Or, to manually connect iAquaLink to a network with an un-broadcasted SSID.

FIG. 8: If Other Selected, a. Enter SSID; b. Enter Password; c. Select Security Type.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of controlling pool or spa equipment installed at a site, comprising:
    a. wirelessly transmitting, from a networking device present at the site, signals mimicking a hot-spot access point fora Wi-Fi network;
    b. receiving, at a receiving device, the signals wirelessly transmitted by the networking device;
    c. receiving user input at the receiving device causing the receiving device to communicate wirelessly with the networking device;
    d. thereafter wirelessly transmitting, from the networking device to the receiving device, a first service set identifier (SSID) of a first Wi-Fi network and a second SSID of a second Wi-Fi network with both of which the networking device is capable of communicating wirelessly;
    e. displaying on the receiving device information about the first and second SSIDs wirelessly transmitted by the networking device;
    f. receiving user input at the receiving device, including receiving a user's selection of the first Wi-Fi network or the second Wi-Fi network, and causing the networking device to communicate wirelessly with the first or second Wi-Fi network as selected by the user; and
    g. controlling pool or spa equipment via the networking device and based at least in part on sensor-derived information about the pool or spa or the pool or spa equipment.

2. A method of controlling pool or spa equipment, comprising:
    a. wirelessly transmitting, from a networking device, signals mimicking a hot-spot access point for a Wi-Fi network;
    b. receiving, at a receiving device, the signals wirelessly transmitted by the networking device;
    c. receiving user input at the receiving device causing the receiving device to communicate wirelessly with the networking device;
    d. thereafter wirelessly transmitting, from. the networking device to the receiving device, a first service set identifier (SSID) of a first Wi-Fi network and a second SSID of a second Wi-Fi network with both of which the networking device is capable of communicating wirelessly;
    e. displaying on the receiving device information about the first and second SSIDs wirelessly transmitted by the networking device;
    f. receiving user input at the receiving device, including receiving a user's selection of the first Wi-Fi network or the second Wi-Fi network, and causing the networking device to communicate wirelessly with the first or second Wi-Fi network as selected by the user;
    g. controlling pool or spa equipment via the networking device and based at least in part on sensor-derived information about the pool or spa or the pool or spa equipment; and
    h. transmitting the sensor-derived information via the Internet to a remote server for analysis.

3. A method of controlling pool or spa equipment, comprising:
    a. wirelessly transmitting, from a combined controller and networking device, signals mimicking a hot-spot access point for a Wi-Fi network;
    b. receiving, at a receiving device, the signals wirelessly transmitted by the combined controller and networking device;
    c. receiving user input at the receiving device causing the receiving device to communicate wirelessly with the combined controller and networking device;
    d. thereafter wirelessly transmitting, from the combined controller and networking device to the receiving device, a first service set identifier (SSID) of a first Wi-Fi network and a second SSID of a second Wi-Fi network with both of which the combined controller and networking device is capable of communicating wirelessly;
    e. displaying on the receiving device information about the first and second SSIDs wirelessly transmitted by the combined controller and networking device;
    f. receiving user input at the receiving device, including receiving a user's selection of the first Wi-Fi network or the second Wi-Fi network, and causing the combined controller and networking device to communicate wirelessly with the first or second Wi-Fi network as selected by the user;
    g. controlling pool or spa equipment via the combined controller and networking device and based at least in part on sensor-derived information about the pool or spa or the pool or spa equipment; and
    h. transmitting the sensor-derived information via the Internet to a remote server for analysis.

4. A method according to claim 2 in which (a) the pool or spa equipment is installed at a site, (b) the networking device is present at and transmits from the site, and (c) the receiving device is a mobile device.

5. A method according to claim 3 in which (a) the pool or spa equipment is installed at a site, (b) the networking device is present at and transmits from the site, and (c) the receiving device is a mobile device.

* * * * *